United States Patent [19]
Yoshida

[11] Patent Number: 5,666,336
[45] Date of Patent: Sep. 9, 1997

[54] REPRODUCTION APPARATUS FOR REPRODUCING FIRST AND SECOND DATA REGIONS ON A CD-ROM

[75] Inventor: Takuji Yoshida, Yokohama, Japan

[73] Assignee: Kabushiki Kaisha Toshiba, Kawasaki, Japan

[21] Appl. No.: 701,881

[22] Filed: Aug. 23, 1996

Related U.S. Application Data

[63] Continuation of Ser. No. 633,517, Apr. 16, 1996, abandoned, which is a continuation of Ser. No. 361,156, Dec. 21, 1994, abandoned, which is a continuation of Ser. No. 133,172, filed as PCT/JP93/00243, Feb. 26, 1993, abandoned.

[30] Foreign Application Priority Data

Feb. 27, 1992 [JP] Japan ................. 4-040891

[51] Int. Cl.⁶ ............................... G11B 17/22
[52] U.S. Cl. ............................... 369/32; 369/48
[58] Field of Search ................. 369/32, 47, 48, 369/44.28, 44.11, 44.29, 44.31, 54, 275.3

[56] References Cited

U.S. PATENT DOCUMENTS 4,949,323  8/1990  Yoshida ..................... 369/32

FOREIGN PATENT DOCUMENTS

| | | |
|---|---|---|
| 62-71080 | 4/1987 | Japan . |
| 62-212989 | 9/1987 | Japan . |
| 142091 | 2/1989 | Japan . |
| 4-10228 | 1/1992 | Japan . |

OTHER PUBLICATIONS

Patent Abstracts of Japan, vol. 011, No. 270 (P–611), 3 Sep. 1987 and JP-A-62 071080 (Toshiba Corp.) 1 Apr. 1987.

"Electronics Life", Nippon Hoso Shuppan Kyokai, Jan. 1, 1988.

*Primary Examiner*—Tan Dinh
*Attorney, Agent, or Firm*—Cushman, Darby & Cushman IP Group of Pillsbury Madison & Sutro LLP

[57] ABSTRACT

A disk reproducing apparatus comprises recording unit for measuring an error component ε between an address represented by sub-code Q data on an information data recording region on a CD-ROM disk and an address represented by header address data, and recording the measured error component ε on the information data recording region, and correction unit for reading out, from the recording unit to, the error component ε corresponding to the information data recording region including a target position to which a pickup is to be moved, in the state in which the target position is set by the address represented by the sub-code Q data and a search for the information data recorded on the information data recording region has been requested, and for correcting the position where the pickup is to be stopped on the basis of the error component ε.

10 Claims, 3 Drawing Sheets

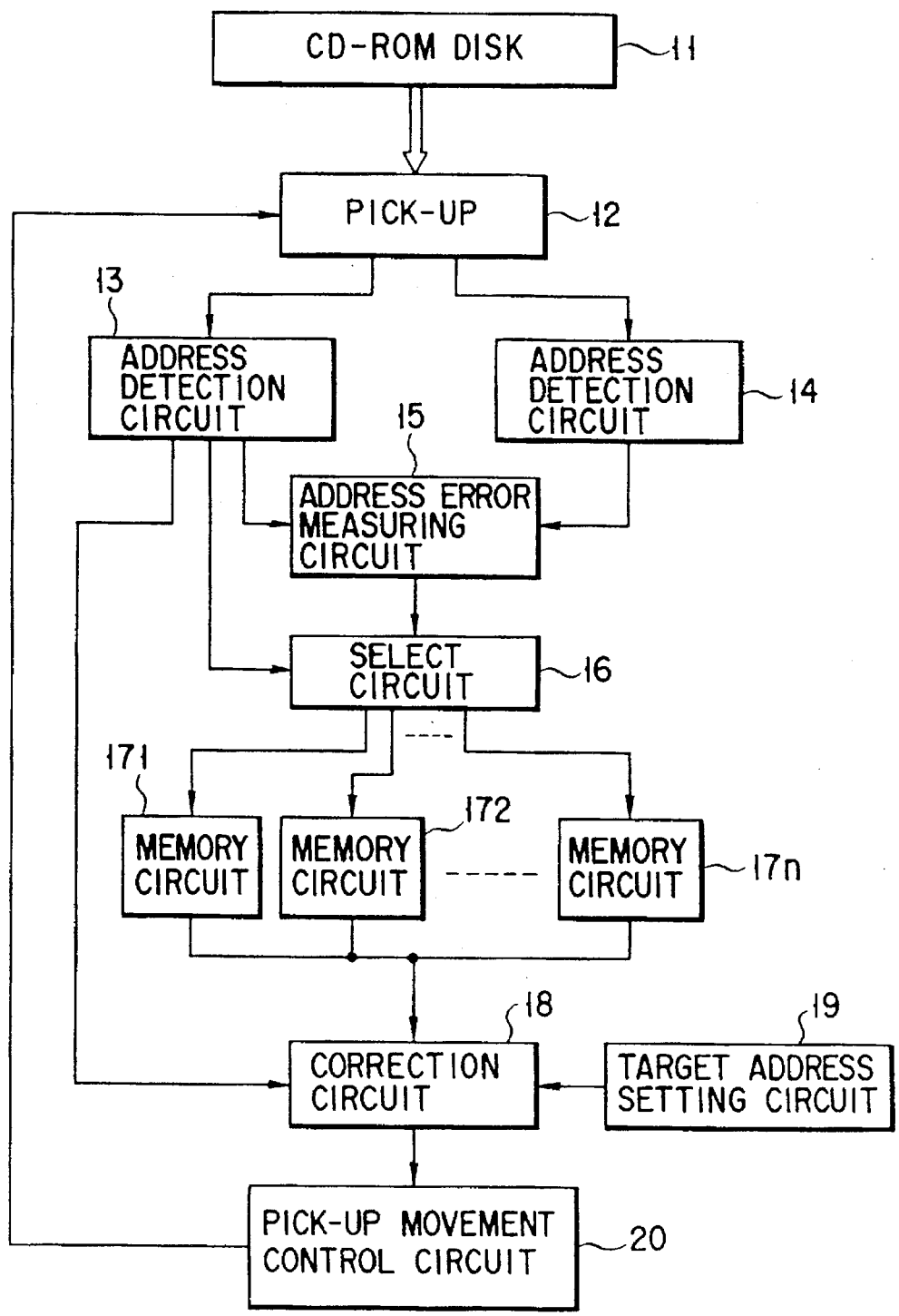
F I G. 3

REPRODUCTION APPARATUS FOR REPRODUCING FIRST AND SECOND DATA REGIONS ON A CD-ROM

This is a continuation of application Ser. No. 08/633,517, filed on Apr. 16, 1996, which was abandoned upon filing hereof, which was a continuation of application Ser. No. 08/361,156, filed Dec. 21, 1994, now abandoned, which was a continuation of application Ser. No. 08/133,172, filed as PCT/JP93/00243, Feb. 26, 1993, now abandoned.

TECHNICAL FIELD

The present invention relates to a disk reproducing apparatus for reproducing, e.g. a CD (Compact Disk)-ROM (Read-Only Memory) disk, and more particularly to a disk reproducing apparatus wherein an error between a sub-code address and a header address of a CD-ROM disk is corrected when data on an information data recording region is searched at high speed from a voice data recording region of the CD-ROM disk, thereby enabling a quick, exact high-speed search operation.

BACKGROUND ART

As is well known, a digital recording/reproducing system has been developed, wherein an analog voice signal is encoded digitally and recorded on a disk, and the digital voice data is read from the disk and reproduced. There are various digital recording/reproducing systems. At present, a digital recording/reproducing system adopting a CD method is widely used.

Recently, a CD-ROM method has been developed as an applied standard of the CD method. According to the CD-ROM method, digital data (hereinafter referred to as "information data") for use in computers is recorded on a disk, in place of digital voice data. Thereby, the disk is employed as a ROM.

FIG. 1 shows a data standard for the CD-ROM method. According to the CD-ROM method, PCM (Pulse-Code-Modulated) 16-bit information data is arranged on each of the positions of L (Left)-channel digital voice data and R (Right)-channel digital voice data of a CD format. The 16-bit information data is divided into 8-bit (1 byte) groups, and 2352 bytes of each 8-bit group constituting one unit (1 block) are recorded on a disk (not shown).

One block comprises a 12-byte sync data region, a where sync data of a predetermined pattern for indicating a start of the block is located, a 4-byte address region b, where header address data for indicating an on-disk position of the block or a block address is located, and a 2336-byte data region c where information data is located.

The data region c includes a 288-byte error correction data region on which error correction data for error detection and error correction of information data located within the data region c is located. Thus, substantially, the data region c includes "2336−288=2048" bytes for the user's information data.

In the CD-ROM method, by using the error correction data, a final error rate of information data located on the data region c is improved to $10^{-12}$. This error rate is substantially equal to an error rate of a data recording medium generally used for computers.

According to the CD-ROM method, the data transfer rate is about 150 k-bytes/sec. If information data corresponding to one hour is recorded on a disk, the disk becomes a data recording medium of large capacity, i.e. 150 k×60 sec.×60 min.=540 M-bytes. In other words, according to the CD-ROM method, as compared to a recording/reproducing system using a conventional disk as data recording medium, information data recording/reproducing can be achieved with a large recording capacity at a low error rate.

Further, in the CD-ROM method, the entire data recording region of the disk does not have to be used as information data recording region. Part of the data recording region may be used as voice data recording region. In this case, in the CD-ROM method, the information data recording region and voice data recording region can be discriminated by rewriting control bits of sub-code Q data written independently on the information data recording region and voice data recording region on the disk. Thereby, both information data and voice data can be written on the same disk.

When a disk on which information is recorded according to the data standard of the CD-ROM method is actually reproduced, it is necessary to provide a CD-ROM drive including a mechanism for rotating the disk and a pickup for reading information data recorded on the disk, and a host computer for controlling the operation of the CD-ROM drive. Normally, a keyboard connected to the host computer is operated, thereby transferring a desired command to the CD-ROM drive. Then, in the CD-ROM drive, information data of a designated address is searched at high speed in accordance with the input command, and the read information data is transferred to the host computer. Thus, a series of data processing is executed.

As has been described above, on the disk on which both information data and voice data are recorded, sub-code Q data representing successive addresses in connection with all data recording regions of the disk and header address data representing addresses in connection with only the information data recording region are recorded, irrespective of the information data recording region and voice data recording region. When data on the voice data recording region is searched at high speed, the address represented by the sub-code Q data is used. When data on the information data recording region is searched at high speed, the address represented by the header address data is used.

In the information data recording region of the disk, both sub-code Q data and header address data are present. In this case, although the sub-code Q data and header address data are data indicating the same position the information data recording region of on the disk, a maximum error of 1 second is allowable according to the CD-ROM standard.

Thus, when the high-speed search for data on the information data recording region is requested in the state in which the pickup is present on the voice data recording region, the sub-code Q data is first read in the CD-ROM drive. Thereby, the address of the current position of the pickup is recognized. Thereafter, the CD-ROM drive calculates an amount of movement of the pickup on the basis of the address of the current position of the pickup and the address of a target position expressed by the sub-code Q data, and thereby moves the pickup.

When the pickup has reached a point near the target position, i.e. when the pickup has reached the information data recording region, the CD-ROM drive reads the header address data and searches the exact target position on the basis of the address thereof.

There is no problem in the high-speed search if the header address data and sub-code Q data indicate the same position on the disk. However, as stated above, a maximum error of 1 second is allowed therebetween according to the CD-ROM standard. Now suppose that such error is ε. In the high-speed search procedure, when an error between the address of the current position represented by the sub-code Q data and the address of the target position has become α, an error between the address of the current position represented by the sub-code Q data and the address of the target position represented by the header address data is α±ε, and, in the worst case, α+1 (sec.).

Specifically, in this high-speed search operation, the search operation is executed such that a position slightly different from the actual target position is searched. A correction of the position of the pickup is required in the final stage, and a quick, exact search operation cannot be performed.

For example, even if the error between the address of the current position represented by the sub-code Q data and the address of the target position becomes zero by a single track-jump operation (α=0), it is necessary to perform, once again, a track-jump operation corresponding to the error ε between the address of the target position represented by the sub-code Q data and the address of the target data represented by the header address data. Consequently, a search time is wasted, and a serious problem is posed for the CD-ROM which requires high-speed search operations.

In the prior art, in order to solve the above problem, the error ε between the address represented by the sub-code Q data and the address represented by the header address data in the same position on the information data recording region of the disk is first measured, and the measured value is stored. Then, the address of the current position represented by the sub-code Q data is converted to an address of the current position represented by the header address data on the basis of the stored address error ε. Two means have been considered: 1) means for performing a track-jump operation in accordance with the positive/negative of an error between the converted address and the address of the target position represented by the header address data, and 2) means for reading the header address data in the state in which the error between the address of the current position represented by the sub-code Q data and the address of the target position is within a predetermined value (e.g. ±2 sec.) and performing the search operation on the basis of the address of the read header address data and the address of the target position represented by the header address data.

Thereby, even if the data on the information data recording region is searched at high speed from the voice data recording region on the basis of the address represented by the sub-code Q data, a position substantially equal to the actual target position can be searched. Thus, the quick, exact search operation can be performed without a useless operation for correcting the pickup position.

In the prior art, the error ε between the address represented by the sub-code Q data and the address represented by the header address data on the same position on the information data recording region of the disk is measured and stored only once at a given position on the same information data recording region. However, in the case of a disk on which a plurality of information data recording regions and a plurality of voice data recording regions are alternately arranged, there is no problem if the error ε between the address represented by the sub-code Q data and the address represented by the header address data is equal on all the information data recording regions. However, there are disks having a variable error s between outer portions and inner portions of the disk. In such disks, exact correction cannot be achieved by the above-described correction method.

In the CD-ROM method, it is required that desired information be searched at high speed. In mechanical aspects, a linear motor is used in a pickup feeding mechanism. It is desired, however, that excellent control functions be provided via software. In the case of searching desired information data present on the information data recording region of the disk according to the CD-ROM method, header address data must be used.

Specifically, a search of a block having desired information data cannot be executed with the address represented by the sub-code Q data. The reason is that the address represented by the sub-code Q data is added in order to imaginarily indicate the position of the voice data recorded on the disk and it does not exactly coincide with one block of CD-ROM standard in which data is divided in units of 2352 bytes.

Basically, just after the start of the high-speed search operation, the address represented by the sub-code Q data is used as an address indicating the current position. After the pickup has reached a point near the address of the target position represented by the sub-code Q data, the search operation is carried out on the basis of the address represented by the header address data. In other words, in the high-speed search operation, an error ε of 1 sec. at maximum is allowed between the address represented by the sub-code Q data and the address represented by the header address data according to the CD-ROM standard. Thus, the high-speed operation is executed to search for a position slightly different from the actual target position. Consequently, the above-mentioned useless correction operation for the pickup is performed.

In order to solve this problem, there has been conventional means for measuring an error ε between the address represented by the sub-code Q data and the address represented by the header address data on a predetermined position of the disk, and then adding the error ε to the address represented by the sub-code Q data, thus executing correction. The condition for realizing this means is that the frame (block) frequencies of both the header address data and sub-code Q data are 75 Hz and both addresses represented by both data must not be temporally non-continuous (irregular). Specifically, it is assumed that the error ε between the address represented by the sub-code Q data and the address represented by the header address data is constant in any position on the disk.

However, it is thought that the error ε between the address represented by the sub-code Q data and the address represented by the header address data may differ between an inner portion and an outer portion of the disk. This is permitted by the CD-ROM standard. The CD-ROM method is an applied technique of the CD method. The CD-ROM disk is manufactured in substantially the same process as the disk of the CD method.

In the CD method, voice data to be recorded is recorded once on a tape, etc., and sub-code Q data is automatically added by a CD encoder. More specifically, the tape on which the voice data has been recorded is reproduced in synchronism with the CD encoder, and thereby both voice data and sub-code Q data are recorded on the disk.

In this case, the operational basic frequency of the CD encoder is 75 Hz, and of course the control in units of 1/75 sec. is possible. However, since the operational frequency of the tape is not 75 Hz but, e.g. 15 Hz, the basic cycle of data recorded on the tape is not in units of 1/75 sec.

When voice data is recorded on the tape, the voice data is input from a voice source in synchronism with the basic frequency of the tape. When information data is recorded, the information data is normally recorded on the tape in the same procedure as that for inputting CD-ROM-standardized data sequences from a computer. Thus, start points of voice data and information data are present only at positions corresponding to a positive number of times the basic frequency of the tape. Accordingly, an error between the recording frequency of the tape and the recording frequency (75 Hz) of the CD encoder becomes the error $\epsilon$ between the address represented by the sub-code Q data and the address represented by the header address data.

Thus, for example, when only information data is recorded on all data recording regions of the disk, synchronization between the tape and the input data from the computer is effected only once, and therefore a constant phase difference is kept between addresses of the tape and CD encoder and the error $\epsilon$ between the address represented by the sub-code Q data on the entire data recording regions of the disk and the address represented by the header address data can be kept constant.

However, in the case where recording is effected with plural voice data recording regions and plural information data recording regions alternately arranged on the disk, synchronization with input data from the computer is effected at the start position of each information data unit. Thus, an error $\epsilon$ between the address represented by the sub-code Q data and the address represented by the header address data occurs newly from that position. Specifically, as shown in FIG. 2, a new error $\epsilon$ between the address represented by the sub-code Q data and the address represented by the header address data is determined on the basis of a boundary between the voice data recording region and information data recording region. The difference $\epsilon$ is constant from the next information data recording region to the boundary with the voice data recording region.

For example, in FIG. 2, the error $\epsilon p$ between the address represented by the sub-code Q data and the address represented by the header address data in the information data recording region including point P is +0.5 sec. The error $\epsilon q$ between the address represented by the sub-code Q data and the address represented by the header address data in the information data recording region including point Q is −1 sec.

Suppose that with the above disk, the error $\epsilon p$ (+0.5 sec.) between the address represented by the sub-code Q data and the address represented by the header address data in the information data recording region including point P was stored by using the above-described conventional address error correction method, and a target position present in the information data recording region including point Q was searched at high speed. In this case, the address of the target position represented by the sub-code Q data in the information data recording region including point Q is corrected by −0.5 sec. and the address represented by the actual header address data would be wrongly corrected, like "$\epsilon p + \epsilon q = -1.5$ sec." This means that the effect of correction is not achieved, and also that correction would be effected in a wrong direction.

As has been described above, in the conventional disk reproducing apparatus for reproducing the CD-ROM disk, etc. on which information data for computers and voice data are recorded mixedly, it is difficult to exactly correct the error between the address represented by the sub-code Q data and the address represented by the header address data in the high-speed search operation.

The present invention has been made in consideration of the above circumstances, and its object is to provide a disk reproducing apparatus capable of exactly correcting an error between an address represented by sub-code Q data and an address represented header address data, for example, in the case of a CD-ROM method, thereby performing a quick, exact search operation.

SUMMARY OF THE INVENTION

According to the present invention, there is provided a disk reproducing apparatus for reproducing, via a pickup, a disk on which a first data region and a second data region are recorded mixedly, the first data region storing first to-be-reproduced data, first address data or position information representing a position of the first to-be-reproduced data, and second address data representing a position of the first to-be-reproduced data like the first address data, and the second data region storing second to-be-reproduced data and address data as position information indicating the position of the second to-be-reproduced data, the disk reproducing apparatus comprising:
  recording means for measuring an error component between the first address data and the second address data of the first data region on the disk, and recording the error component on the first data region on which the measurement has been effected; and
  correction means for reading out, from the recording means, the error component corresponding to the first data region including a target position to which the pickup is to be moved, in the state in which the target position is set by the second address data and a search for the first to-be-reproduced data recorded on the first data region has been requested, and for correcting the position where the pickup is to be stopped on the basis of the error component.

According to the above structure, the error component between the first address data and second address data on the first data region on the disk is measured and stored, and the search operation for the first data region is performed on the basis of the second address data. In this case, the error component on the first data region including the target position is read out, and the position where the pickup is to be stopped is corrected on the basis of the error component. Therefore, the error between the first address data and second address data can be corrected exactly, and a quick, accurate search operation can be performed.

BRIEF DESCRIPTION OF DRAWINGS

FIG. 3 is a block diagram showing an embodiment of a disk reproducing apparatus according to the present invention.

BEST MODE OF CARRYING OUT THE INVENTION

Figure 1:
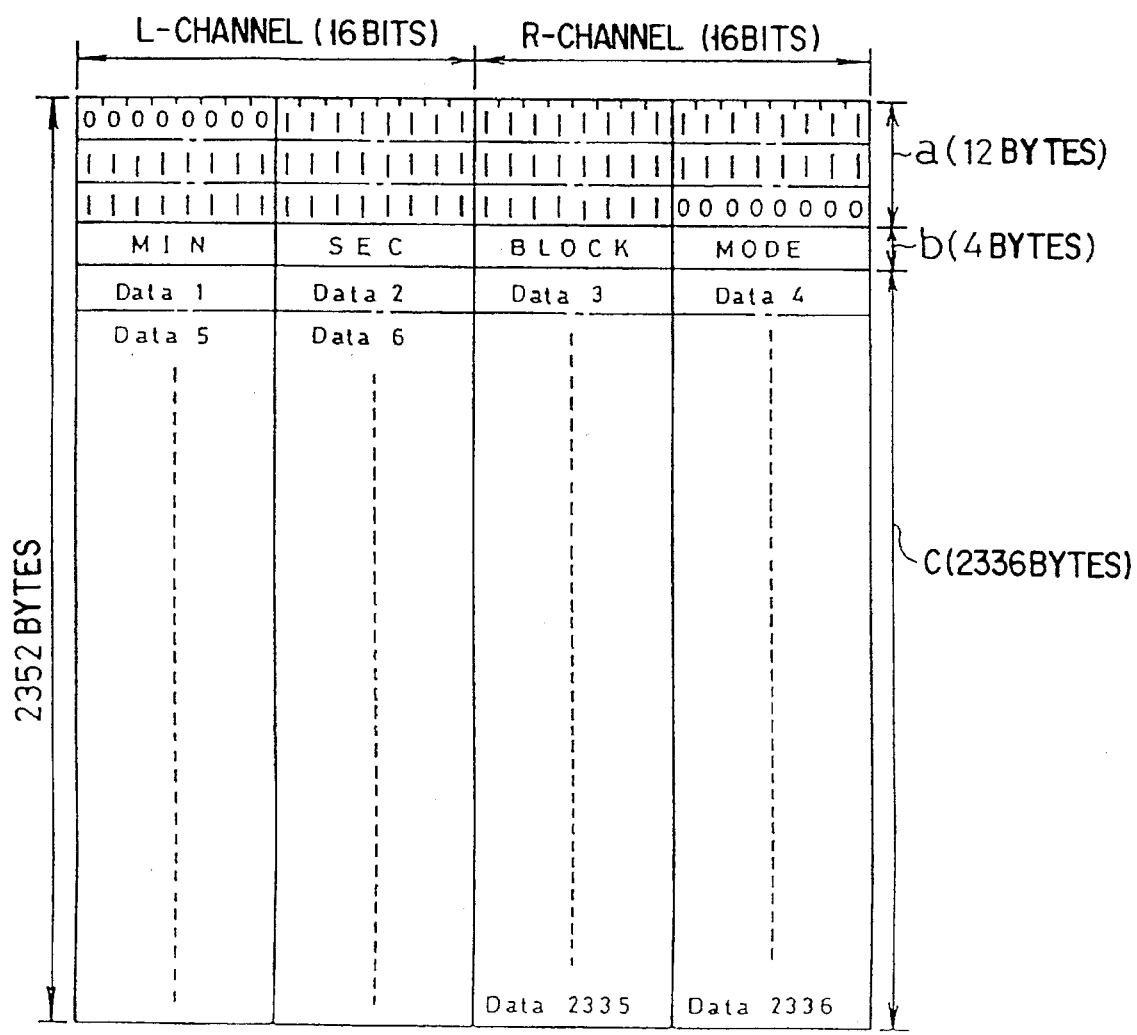
FIG. 1 is a view illustrating a data standard in a CD-ROM method.

An embodiment of the present invention will now be described in detail with reference to the accompanying drawings. FIG. 3 shows a CD-ROM drive to which the present invention has been applied. Data recorded on a CD-ROM disk 11 is read out by means of an optical pickup 12. Of the read-out data, an address component represented by sub-code Q data is detected by an address detection circuit 13, and an address component represented by header address data is detected by an address detection circuit 14. The address represented by the sub-code Q data, detected by the address detection circuit 13, and the address represented by the header address data, detected by the address detection circuit 14, are supplied to an address error measuring circuit 15, and thereby an address error $\epsilon$ therebetween is measured.

Figure 2:
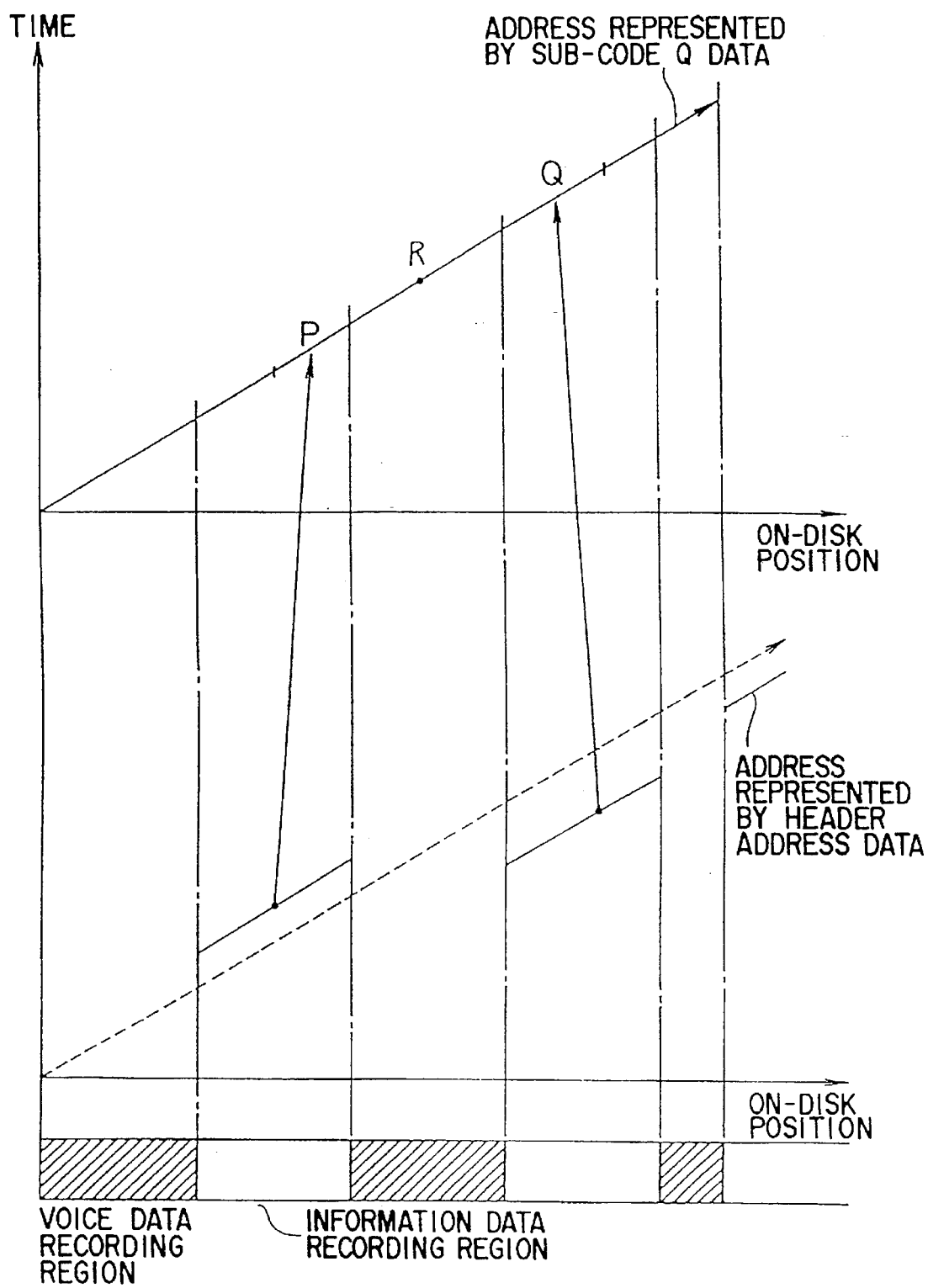
FIG. 2 is a view illustrating an error between an address represented by sub-code Q data and an address represented by header address data.

The address error $\epsilon$ measured by the address error measuring circuit 15 is output to and stored in any of a plurality of memory circuits 171,172, . . . , 17n by a select circuit 16 driven by a command from the address detection circuit 13. The storage operation at this time will now be described. For example, in FIG. 2, the error $\epsilon p$ between the address represented by sub-code Q data and the address represented by header address data on the information data recording region including point P is stored in the memory circuit 171, and the error $\epsilon q$ between the address represented by sub-code Q data and the address represented by header address data on the information data recording region including point Q is stored in the memory circuit 172.

Specifically, the error $\epsilon$ between the address represented by the sub-code Q data and the address represented by the header address data is measured for each of information data recording regions arranged on the CD-ROM disk 11. The measured address errors $\epsilon$ are stored in different memory circuits 171, 172, . . . , 17n. In this case, the address detection circuit 13 determines which address errors $\epsilon$ of information data recording regions should be stored in which memory circuits 171,172, . . . , 17n.

The address errors $\epsilon$ stored in the memory circuits 171, 172, . . . , 17n are selectively delivered to a correction circuit 18 which is driven by a command from the address detection circuit 13. On the basis of the input address error $\epsilon$, the correction circuit 18 corrects the address of the target position represented by sub-code Q data set in a target address setting circuit 19, so as to coincide with the address of the target position represented by the header address data. The corrected address of the target position represented by the sub-code Q data is fed to a pickup movement control circuit 20. Thus, the stop position of the pickup 12 in the high-speed search operation is determined.

The operation of the apparatus having the above structure will now be described. A change point from the voice data recording region to the information data recording region on the CD-ROM disk 11 can be determined on the basis of TOC (Table-Of-Contents) data recorded on a lead-in area present on an innermost portion of the CD-ROM disk 11. Thus, by reading the TOC data, it is possible to detect whether there are several divided information data recording regions within the program area of the CD-ROM disk 11.

In a preparatory stage, the CD-ROM drive reads the TOC data of the CD-ROM disk 11 and thereby detects whether there are several divided information data recording regions on the program area of the CD-ROM disk 11. In the CD-ROM drive, flags are set for the respective detected information data recording regions, and the flags are set in the clear state. In the CD-ROM disk 11, the maximum number of flags which can be theoretically provided is 49. In this case, flags to be set for the respective information data recording regions are set by making use of portions of memory regions of the memory circuits 171, 172, . . . , 17n which store the address errors $\epsilon$ of the information data recording regions.

Specifically, in the CD-ROM drive, the TOC data of the CD-ROM disk 11 is read to detect whether there are several divided information data recording regions on the program area. Then, the memory circuits 171, 172, . . . , 17n are assigned to the detected information data recording regions, and the contents of flag regions of the memory circuits 171,172, . . . , 17n are set in the clear state. The address errors $\epsilon$ on the information data recording regions and the flags are stored in the assigned memory circuits 171,172, . . . , 17n. For example, in FIG. 2, the flag region corresponding to the information data recording region including point P is set in the memory circuit 171, and the contents of the flag region are set in the clear state. The flag region corresponding to the information data recording region including point Q is set in the memory circuit 172, and the contents of the flag region are set in the clear state.

Thereafter, in the CD-ROM drive, each time the header address data is detected at the time of reproducing the program area of the CD-ROM disk 11, the address error $\epsilon$ between the address represented by the respective header address data and the address represented by the sub-code Q data is measured. In addition, in the CD-ROM drive, one of the divided information data recording regions which corresponds to the measured address error $\epsilon$ is found on the basis of the address represented by the sub-code 0 data, and the flag of the memory circuit 171,172, . . . , 17n corresponding to the information data recording region is checked. If it is found from the check result that the flag is in the clear state, the measured address error $\epsilon$ is stored in the memory circuit 171,172, . . . , 17n by the CD-ROM drive, and the flag is set. If it is found from the check result that the flag has been set, the address error $\epsilon$ is not recorded.

In brief, the CD-ROM drive is provided with a so-called learning function. Each time a new information data recording region is reproduced, the address error $\epsilon$ on that information data recording region is stored successively in the memory circuit 171, 172, . . . , 17n associated with that region.

In the case where a high-speed search operation, for information data within the information data recording region is performed by using the address of the current position represented by the sub-code Q data and the address of the target position represented by the sub-code Q data, the CD-ROM drive finds, from the address of the target position represented by the set sub-code Q data, the information data recording region corresponding to the address and checks the flag thereof. If it is found from the check result that the flag is in the set state, the CD-ROM drive reads out the address error $\epsilon$ from the memory circuit 171, 172, . . . , 17n which stores the flag, and corrects the address of the target position represented by the sub-code Q data, and enables the pickup 12 to perform a track jump operation so that the pickup 12 may reach the corrected target position.

This correction is achieved in the following manner. For example, referring to FIG. 2, when the high-speed search operation is carried out from point R to point Q, the address error $\epsilon$ of the information data recording region including point Q is −1 second, as stated above. Thus, an address corresponding to +1 second is added to the address of the target position (point Q) represented by the sub-code Q data. The pickup 12 is made to perform a track jump operation so as to reach the address of the target position represented by the corrected sub-code Q data. Thus, an exact, quick search operation is achieved.

If it is found from the result of the flag check that the flag is in the clear state and the header address data has been detected, the CD-ROM drive measures the error $\epsilon$ between the address represented by the sub-code Q data and the address represented by the header address data. The measured error ε is stored in the corresponding memory circuit 171, 172, ..., 17n, and the flag thereof is set. In this case, the track jump operation is performed by using the header address data alone, thereby achieving the high-speed search.

With the structure of the above embodiment, the high-speed search operation is performed on the basis of the address represented by the sub-code Q data, while the address error ε, between the address represented by the sub-code Q data and the address represented by the header address data, is measured and stored with respect to each change point from the voice data recording region to information data recording region on the CD-ROM disk 11. In this case, the address error ε on the information data recording region including the target position is read out, and the address error ε is added to the address of the target position represented by the sub-code Q data, thereby correcting the address. Therefore, the error ε between the address represented by the sub-code Q data and the address represented by the header address data can be exactly corrected, and an accurate, quick search operation can be performed.

In addition, in the above embodiment, the correction is performed such that the measured and stored address error ε is added to the address of the target position represented by the sub-code Q data. Needless to say, however, the address of the current position represented by the sub-code Q data may be corrected by using the address error ε. For example, in FIG. 2, when the high-speed search operation is carried out from point R to point Q, the address error ε of the information data recording region including point Q is −1 second, as stated above. Thus, an address corresponding to +1 second is added to the address of the current position (point R) represented by the sub-code Q data. The pickup 12 is made to perform a track jump operation so as to reach the address of the target position represented by the set sub-code Q data. Thus, an exact, quick search operation is achieved.

Further, the correction can be effected by correcting the distance over which the pickup 12 is moved. Specifically, in FIG. 2, when the high-speed search is performed from point R to point Q, a distance corresponding to +1 second, for correcting the address error ε (−1 sec.) on the information data recording region including point Q, is added to the distance between the current position (point R) represented by the sub-code Q data and the target position (point Q) represented by the sub-code Q data. An exact, quick search operation can be carried out by enabling the pickup 12 to perform a track jump operation over the corrected distance.

In the description of the above embodiment, it has been stated that whether or not there are several divided information data recording regions within the program area can be detected by reading the TOC data of the CD-ROM disk 11. This will now be described in more detail. The TOC data includes TNO representing a tune number, a start address (represented sub-code Q data) of the tune represented by the TNO, and control information indicating a play time, etc. of the tune.

The voice data recording region and information data recording region of the CD-ROM disk 11 are composed of units divided by one or more TNOs. For example, referring to FIG. 2, the voice data recording region, preceding the information data recording region including point P, comprises TNO=1, 2 and 3, and the information data recording region including point P comprises TNO=4, 5, 6 and 7. The aforementioned control information includes information as to whether the TNO belongs to the voice data recording region or to the information data recording region. Thus, the CD-ROM drive can detect whether there are several divided information data recording regions within the program area, by reading the TNO in the TOC data and the control information thereof.

The present invention is not limited to the above embodiment, and various modifications can be made without departing from the spirit of the invention.

INDUSTRIAL APPLICABILITY

As has been described above in detail, the present invention can provide a very excellent disk reproducing apparatus wherein, for example, in the case of a CD-ROM disk, an error between the address represented by the sub-code Q data and the address represented by the header address data can be exactly corrected, thereby performing a quick, exact search operation.

I claim:

1. A disk reproducing apparatus for reproducing, via a pickup, information stored on a disk, the disk including a pair of first data regions and a second data region interposed between the pair of first data region, each first data region in the pair of first data regions storing a first kind of data, first address data representing a position of the first first kind of data, and second address data also representing a position of the first kind of data, and the second data region storing a second kind of data, the disk reproducing apparatus comprising:

recording means for detecting the first address data and the second address data stored in each of the first data regions, for measuring an error component between the first address data and the second address data for each of the first data regions on the disk, and for recording the error component associated with each of the first data regions in an error component storage region of the address error measuring circuit; and correction means, responsive to a search for a target position in one of the first data regions, for reading out from the error component storage region of the recording means, the error component associated with the first data region containing the target position to which the pickup is to be moved and for correcting a position at which the pickup is to be stopped based on the the error component retrieved by the correcting means.

2. The disk reproducing apparatus according to claim 1, wherein the correction means corrects address data indicating the target position to which the pickup is to be moved based on the error component read out from the error component storage region of the recording means.

3. The disk reproducing apparatus according to claim 1, wherein the correction means corrects address data indicating a current position of the pickup based on the error component read out from the error component storage region of the recording means.

4. The disk reproducing apparatus according to claim 1, wherein the correction means corrects, on the basis of the error component read out from the error component storage region of the recording means, a distance between a current position of the pickup and the target position to which the pickup is to be moved, the distance being calculated on the basis of the second address data indicating the current position of the pickup and the target position to which the pickup is to be moved.

5. The disk reproducing apparatus according to claim 1, wherein, with respect to the pair of first data regions recorded on the disk, the recording means discriminates, by means of flags, one first data region in the pair of first data region, on which the error component between the first address data and the second address data has been recorded and another first data region in the pair of first data regions on which the error component has not been recorded.

6. The disk reproducing apparatus according to claim 1, wherein the recording means includes a plurality of error component storage regions corresponding to the first data regions recorded on the disk, and a plurality of flag storage regions corresponding to the error component storage regions, and wherein a flag associated with the flag storage region associated with the error component storage region on which the error component has not been recorded is set in a first state, and a flag associated with the flag storage region associated with the error component storage region on which the error component has been recorded is set in a second state.

7. The disk reproducing apparatus according to claim 6, wherein the recording means comprises:

detection means for detecting the first address data for each of the first data regions on the disk;

measuring means for measuring a difference between the first address data and the second address data of the first data region which is being read, in the state in which a detection output is being produced from the detection means; and discrimination means for discriminating the flag in the flag storage region associated with the first data region and, in the state in which the flag is set in the first state is detected, recording the error component measured by the measuring means in the error component storage region corresponding to the first data region and setting the flag of the associated flag storage region in the second state.

8. The disk reproducing apparatus according to claim 1, wherein the disk is defined by a CD-ROM standard.

9. The disk reproducing apparatus according to claim 8, wherein the first kind of data is information data for computers, which is divided in a predetermined block unit, the first address data is header address data indicating the position of the information data in the block unit, the second kind of data is digital voice data, and the second address data is sub-code Q data.

10. The disk reproducing apparatus according to claim 9, wherein the recording means reads TOC data-recorded in a lead-in area of the disk according to the CD-ROM standard, thereby detecting a number of first data recording regions present in a program area of the disk.

* * * * *